United States Patent
Hong (10) Patent No.: US 9,774,361 B2
(45) Date of Patent: Sep. 26, 2017

(54) PORTABLE DEVICE AND METHOD FOR TRANSMITTING SIGNALS FOR COMMUNICATION

(71) Applicant: PANTECH INC., Seoul (KR)

(72) Inventor: Seok jin Hong, Seoul (KR)

(73) Assignee: Pantech, Inc., Seoul (KR)

( * ) Notice: Subject to any disclaimer, the term of this patent is extended or adjusted under 35 U.S.C. 154(b) by 0 days.

(21) Appl. No.: 14/247,947

(22) Filed: Apr. 8, 2014

(65) Prior Publication Data
US 2014/0307570 A1 Oct. 16, 2014

(30) Foreign Application Priority Data
Apr. 10, 2013 (KR) ........................ 10-2013-0039197

(51) Int. Cl.
*H04B 1/38* (2015.01)
*H04B 1/3827* (2015.01)
*H04W 52/26* (2009.01)

(52) U.S. Cl.
CPC ........ *H04B 1/3838* (2013.01); *H04W 52/267* (2013.01)

(58) Field of Classification Search
CPC combination set(s) only.
See application file for complete search history.

(56) References Cited

U.S. PATENT DOCUMENTS

| 8,509,838 B2 | 8/2013 | Lee et al. | |
| 2011/0059706 A1* | 3/2011 | Harel | H04B 7/0404 455/115.1 |
| 2012/0021800 A1* | 1/2012 | Wilson | H04W 52/146 455/550.1 |
| 2014/0133594 A1* | 5/2014 | Kludt | H01Q 1/245 375/267 |

FOREIGN PATENT DOCUMENTS

| KR | 10-2011-0111228 | 10/2011 |
| WO | 2011-112537 | 9/2011 |

* cited by examiner

Primary Examiner — Kouroush Mohebbi
(74) Attorney, Agent, or Firm — H.C. Park & Associates, PLC (57) ABSTRACT

A portable device and a method for transmitting signals at maximum data transmission rate are disclosed herein. The method includes checking minimum transmission power levels of first and the second transmission signals to prevent interrupted transmissions; determining the power levels of the first and the second transmission signals having the maximum data transmission rate based on the minimum transmission power levels and highest transmission power levels satisfying the specific absorption rate (SAR) regulations according to a stored SAR table; transmitting the first and the second transmission signals at the respective determined power levels using a main antenna; and transmitting the second transmission signal using an auxiliary antenna.

18 Claims, 7 Drawing Sheets

| POWER OF FIRST TRANSMISSION SIGNAL dBm | POWER OF SECOND TRANSMISSION SIGNAL dBm | SAR VALUE FOR FIRST AND SECOND TRANSMISSION SIGNALS |
|---|---|---|
| 23 | 20 | < 1.6 W/kg |
| 22 | 21 | < 1.6 W/kg |
| 21 | 22 | < 1.6 W/kg |
| 20 | 23 | < 1.6 W/kg |

FIG. 1

(Related Art)

FIG. 2

(Related Art)

| POWER OF FIRST TRANSMISSION SIGNAL dBm | POWER OF SECOND TRANSMISSION SIGNAL dBm | SAR VALUE FOR FIRST AND SECOND TRANSMISSION SIGNALS |
|---|---|---|
| 23 | 20 | < 1.6 W/kg |
| 22 | 21 | < 1.6 W/kg |
| 21 | 22 | < 1.6 W/kg |
| 20 | 23 | < 1.6 W/kg |

PORTABLE DEVICE AND METHOD FOR TRANSMITTING SIGNALS FOR COMMUNICATION

CROSS-REFERENCE TO RELATED APPLICATION(S)

This application claims priority from and the benefit under 35 U.S.C. §119(a) of Korean Patent Application No. 10-2013-0039197, filed on Apr. 10, 2013, in the Korean Intellectual Property Office, which is hereby incorporated by reference for all purpose as if fully set forth herein.

BACKGROUND

Field

The following description relates to an apparatus and transmission method for transmitting communication signals at the maximum data transmission rate within a range to satisfy the specific absorption rate (SAR) regulations associated with electromagnetic wave exposure from a portable device.

Discussions of Background

With the development of data communication and display technologies, portable devices (for example, smartphones and tablet PCs) which enable data communication have become a necessity for modern people. Such portable devices operate based on electronic components and thus expose users to electromagnetic waves. Recently, as the harmfulness of electromagnetic waves to the human body has become an issue, specific absorption rate (SAR) regulations for portable devices have been established. SAR regulations use energy absorbed per unit time and mass as an index, and regulate the rate of absorption of electromagnetic wave energy by a biological tissue, and is measured in W/kg. In the Republic of Korea, the limit SAR value for portable devices is set at 1.6 W/kg, and since April 2002, a SAR limit value for the human body has been introduced to protect the human body against electromagnetic waves absorption. Therefore, SAR values of portable devices have been required to be tested and the sale of portable devices with a SAR value higher than the limit value has been prohibited. In the Republic of Korea, the government has further proposed amendments to heighten the SAR regulations. In the amended SAR regulations, Body SAR regulations which require measuring SARs of the six sides of a portable device have been added, and a grading system has also been implemented.

Figure 1:
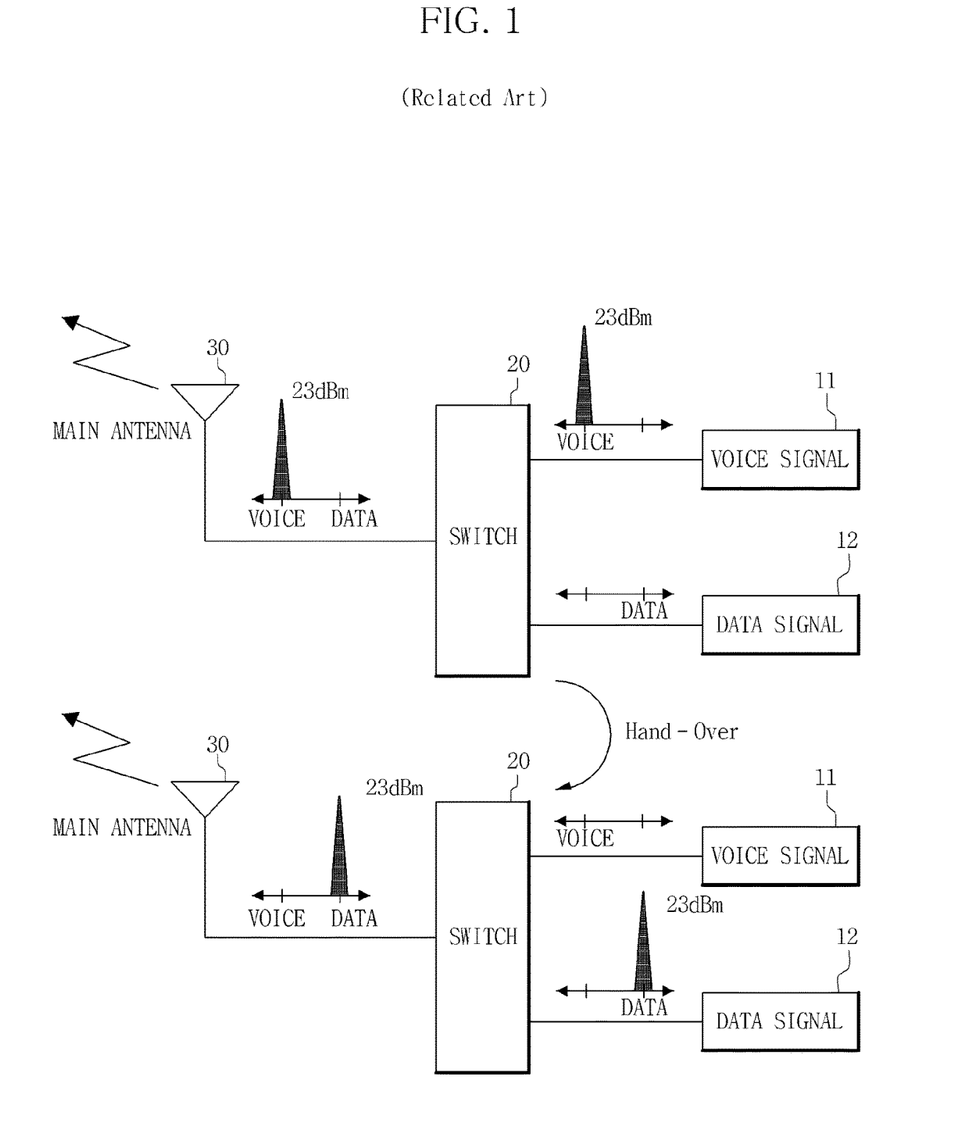
FIG. 1 is a conceptual diagram of a transmission method of a CSFB type portable device according to the related art.

As illustrated in FIG. 1, a circuit switched fall-back (CSFB) type portable device is designed to perform communication only in a single frequency band through a main antenna 30 even when two different frequency bands are supported. For example, the portable device is designed such that in a case where transmission of a voice signal 11 is requested while transmission of a data signal 12 is performed, a channel regarding the transmission of the data signal 12 is disconnected by a switch 20, a channel regarding the transmission of the voice signal 11 is connected by the switch 20, and the main antenna 30 performs communication only in a single frequency band. Since the existing SAR regulations only required SAR measurement at a human's head, for a CSFB type portable device, the SAR regulations could be easily satisfied by positioning the main antenna 30 at a position farthest from the head.

However, the CSFB type portable device has a disadvantage that communication in a certain frequency band may be interrupted. In the above example, transmission of voice signal 11 is interrupted by communication of the data signal 12. Therefore, the simultaneous voice and LTE (SVLTE) technology which simultaneously enables transmission and reception in two or more frequency bands has been introduced. However, since the SVLTE technology uses a CDMA network and a LTE network at the same time, there is a limit in improving data transmission rates. Accordingly, the SVLTE technology has been further developed into LTE carrier aggregation (CA) technology which performs transmission and reception simultaneously using two LTE networks.

Figure 2:
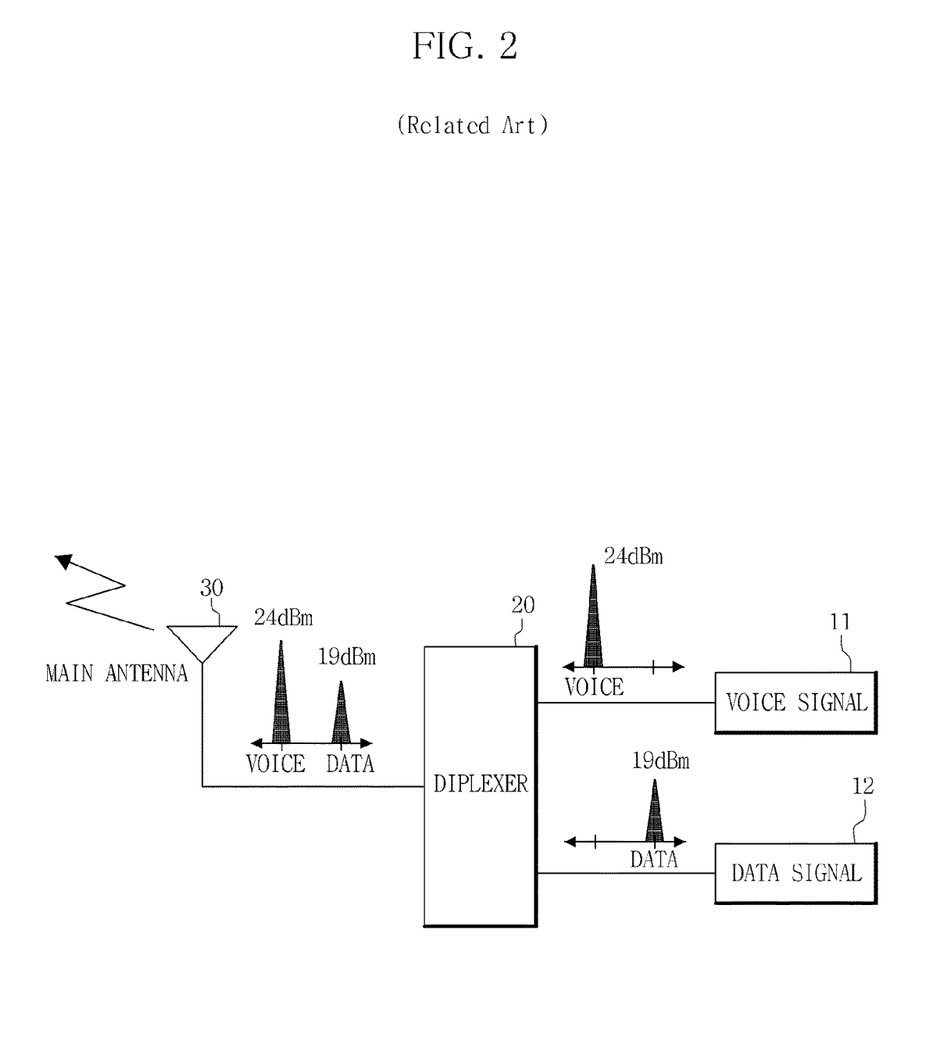
FIG. 2 is a conceptual diagram of a transmission method of an SVLTE type portable device according to the related art.

Referring to FIG. 2, a portable device which uses the LTE CA technology has a diplexer 20 inserted instead of a switch as shown in FIG. 1. The diplexer 20 filters each signal, and may transmit two LTE signals 11, 12 in different frequency bands by simultaneously filtering the two LTE signals. Accordingly, voice communication and data communication can be simultaneously performed over the LTE network, and thus data signals can be continuously received without interruption even during voice communication.

Since strength of electromagnetic waves increase as the power of transmission signals increase, in order for the LTE CA type portable device to comply with the SAR regulations, the power of a signal associated with a certain frequency band may need to be limited. For example, if the transmission power of the voice signal 11 is equal to or higher than a predetermined magnitude (for example, 20 dBm or higher), even if a base station commands the portable device to transmit the data signal 12 at its maximum magnitude (for example, 23 dBm), the portable device may need to control the magnitude of the transmission power of the data signal 12 to be set at a predetermined magnitude (for example, 19 dBm) or less.

The LTE CA type portable device has problems that in a poor electromagnetic wave environment, the data transmission rate may decrease, the signal quality of data communication may be degraded, and/or the communication may be interrupted. To resolve these problems, considering the fact that the electromagnetic wave absorption rate can be decreased by increasing the distance between the transmission antennas, a transmission method using a plurality of transmission antennas may be considered. However, since multipurpose antennas such as a GPS, Bluetooth, and Wi-Fi all need to be integrated in the portable device, there is a limit in satisfying the SAR regulations by increasing the distance between the multiple antennas.

SUMMARY

Exemplary embodiments of the present invention provide a portable device and a method for transmitting signals for communication.

Exemplary embodiments of the present invention provide a portable device and a method for transmitting signals by using a storage unit to store pairs of power levels of transmission signals and/or an auxiliary antenna in addition to a main antenna.

Additional features of the invention will be set forth in the description which follow, and in part will be apparent from the description, or may be learned by practice of the invention.

An exemplary embodiment of the present invention provides a portable device including a transmission signal generator to generate a transmission signal generator to generate a first transmission signal and a second transmission signal; a first diplexer to transmit the first transmission signal and the second transmission signal; a main antenna to receive the first transmission signal and the second transmission signal; a storage unit to store a power level of the first transmission signal and a corresponding power level of the second transmission signal; a measuring unit to measure a data transmission rate of the first transmission signal and the second transmission signal; and a control unit to set the power levels of the first transmission signal and the second transmission signal according to the stored power levels.

An exemplary embodiment of the present invention provides a method for generating a first transmission signal and a second transmission signal from a transmission generator; transmitting the first transmission signal and the second transmission signal from a diplexer to a main antenna; storing a power level of the first transmission signal and a corresponding power level of the second transmission signal; measuring a data transmission rate of the first transmission signal and the second transmission signal; and controlling the power levels of the first transmission rate and the second transmission rate according to stored power levels.

An exemplary embodiment of the present invention provides a portable device including a transmission signal generator to generate a transmission signal generator to generate a first transmission signal and a second transmission signal; a first diplexer to transmit the first transmission signal and the second transmission signal; a second diplexer to transmit the second transmission signal; a main antenna to receive the first transmission signal and the second transmission signal; an auxiliary antenna to receive the second transmission signal; a switch to connect the transmission signal generator to the first diplexer or the second diplexer; a storage unit to store a power level of the first transmission signal and a corresponding power level of the second transmission signal; a measuring unit to measure a data transmission rate of the first transmission signal and the second transmission signal; and a control unit to set the power levels of the first transmission signal and the second transmission signal according to the stored power levels.

An exemplary embodiment of the present invention provides a method for generating a first transmission signal and a second transmission signal from a transmission generator; transmitting the first transmission signal from a first diplexer to a main antenna; transmitting the second transmission signal from a second diplexer to an auxiliary antenna; storing a power level of the first transmission signal and a corresponding power level of the second transmission signal; measuring a data transmission rate of by the main antenna and the auxiliary antenna; controlling the power levels of the first transmission rate and the second transmission rate according to stored power levels; and controlling the second transmission signal to be transmitted by the main antenna or the auxiliary antenna based on the measured data transmission rate.

It is to be understood that both the foregoing general description and the following detailed description are exemplary and explanatory and are intended to provide further explanation of the invention as claimed. Other features and aspects will be apparent from the following detailed description, the drawings and the claims.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item. The use of the terms "first", "second", and the like does not imply any particular order, but they are included to identify individual elements. Moreover, the use of the terms first, second, etc. does not denote any order or importance, but rather the terms first, second, etc. are used to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. It will be understood that for the purposes of this disclosure, "at least one of" will be interpreted to mean any combination the enumerated elements following the respective language, including combination of multiples of the enumerated elements. For example, "at least one of X, Y, and Z" will be construed to mean X only, Y only, Z only, or any combination of two or more items X, Y, and Z (e.g. XYZ, XZ, XZZ, YZ, X).

Hereinafter, a portable device and a transmission method of a portable device according to an exemplary embodiment of the present invention will be described in detail with reference to the accompanying drawings.

Figure 3:
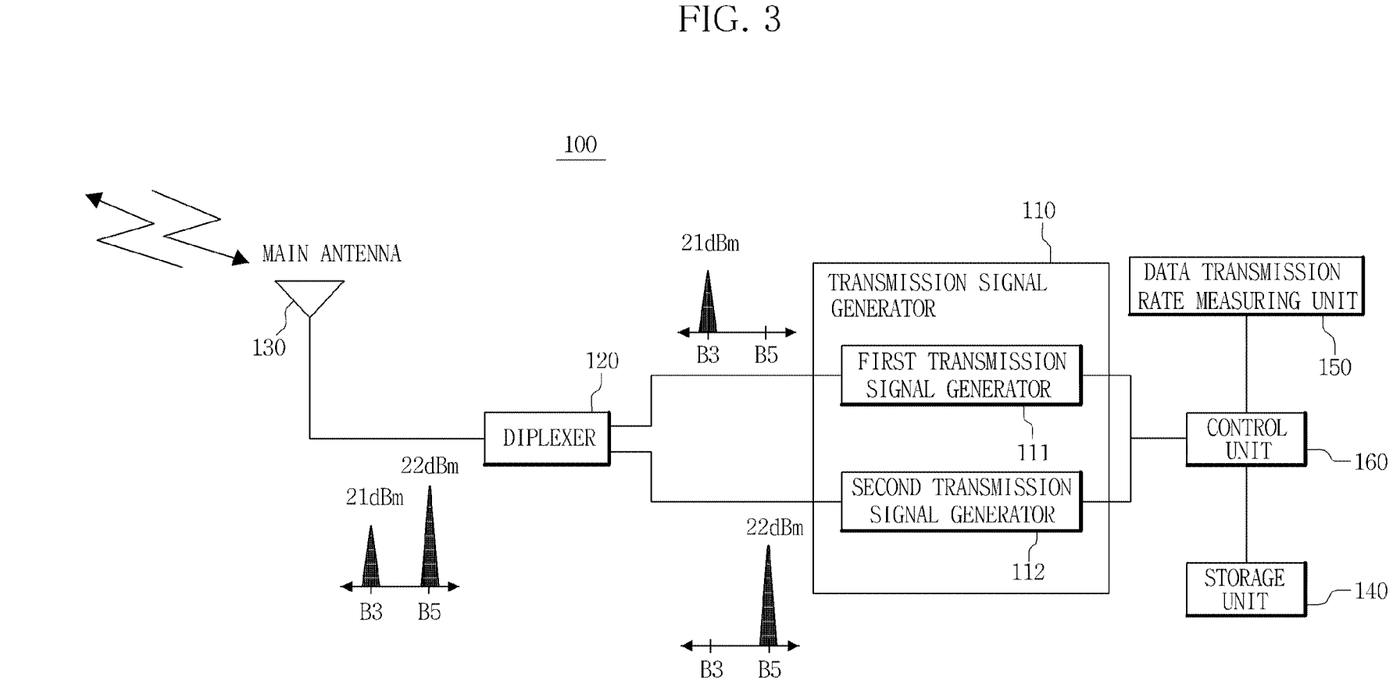
FIG. 3 is a structural diagram of a portable device according to an exemplary embodiment of the present invention.

FIG. 3 is a diagram illustrating a portable device 100 including a transmission signal generator 110, a diplexer 120, a main antenna 130, a storage unit 140, a data transmission rate measuring unit 150, and a control unit 160 according to an exemplary embodiment of the present invention.

As illustrated in FIG. 3, the transmission signal generator 110 includes a first transmission signal generator 111 and a second transmission signal generator 112, and generates a first transmission signal and a second transmission signal having different frequency bands. The first and the second transmission signals may be signals which use various communication networks, for example, the second to the fourth generation communication networks, such as long-term evolution (LTE), wideband code division multiple access (WCDMA), and global system for mobile communications (GSM), and the first and second transmission signals may be signals which use communication networks after the fourth generation communication network. The portable device 100 according to an exemplary embodiment of the present disclosure may have an LTE carrier aggregation (CA) type configuration, where the first and the second transmission signals use the LTE communication network; however, aspects need not be limited thereto such that other network configurations may be available according to aspects of the present invention. The frequency bands of the LTE communication network such as B1 (2.1 GHz), B3 (1.7 to 1.8 GHz), B5 (800 MHz), etc. may be present. The first transmission signal may be in one of the frequency bands, and the second transmission signal may be in another of the frequency bands. For example, the first transmission signal may be a signal in the frequency band of B3, and the second transmission signal may be a signal in the frequency band of B5. Meanwhile, the transmission signal generator 110 may also receive communication signals. Generally, since the transmission path and the reception path of the portable device 100 are the same, the transmission signal generator 110 may both transmit and receive communication signals.

The diplexer 120 may transmit the first and the second transmission signals to the main antenna 130 while not affecting or interfering with each other. Generally, the diplexer 120 is a device which transmits signals individually sent from two circuits to a single circuit without affecting each other. The diplexer 120 generally includes branching filter elements to simultaneously send and receive two different signals having different frequencies. The diplexer 120 enables independent signal transmissions by simple frequency band separation of the two signals having apparently different frequencies, and thus is generally configured in a form in which a low-pass filter and a high-pass filter are combined. The first transmission signal and the second transmission signal are independently transmitted to the main antenna 130 through the diplexer 120 while not affecting or interfering with each other. For example, the first transmission signal and the second transmission signal may be independently transmitted to the main antenna 130 in the B3 band and the B5 band, respectively, through the diplexer 120 while not affecting or interfering with each other.

The main antenna 130 receives the first and the second transmission signals from the diplexer 120 and simultaneously or nearly simultaneously transmits the signals to a base station through channels corresponding to the frequency bands of the first and the second transmission signals. In order to transmit the first and the second transmission signals, the main antenna 130 may transmit and receive signals to and from a communication network introduced after the second generation communication network such as LTE, WCDMA, and GSM. In addition, the main antenna 130 may receive a reception signal from the base station. The reception signal may include information on a signal to noise ratio (SNR) between the base station and the portable device 100. For example, the main antenna 130 may receive the information on the SNRs regarding a first transmission channel for the transmission of the first transmission signal and a second transmission channel for the transmission of the second transmission signal. The SNR is defined as a ratio between signal power and noise power, and a level of the transmission power at which noise may be minimized may be determined by the SNR. Therefore, the SNR is a factor that gives information on the minimum transmission power level.

The storage unit 140 may store the information regarding the SNR between the base station and the portable device 100 received from the base station by the main antenna 130, information regarding the minimum transmission power level that does not interrupt communication between the portable device 100 and the base station, and a SAR table. The information regarding the minimum transmission power level may be acquired or determined by analyzing the information regarding the SNR in the control unit 160. In addition, the SAR table is a table that stores a list of transmission power levels of the first and second transmission signals to enable the portable device 100 to satisfy the SAR regulations of each country.

As described above, the SAR regulations are regulations limiting the rate of absorption of electromagnetic waves by a human body, and in Republic of Korea, from 2013, both the SAR values for the head and the body have been regulated to be 1.6 W/kg or less. Electromagnetic waves may be measured by the magnitude of the power used by electronic components of the portable device 100 during transmission and reception of signals. Generally, it is difficult to limit the strength of received signal when the signal is received from the base station, while it is possible to control the magnitude of the power of the signal transmitted from the portable device 100 itself. Therefore, the SAR is regulated in terms of the portable device signal transmission. In addition, the SAR value is proportional to the power of the transmission signal and is inversely proportional to the distance between the transmission antennas. Therefore, design factors such as the magnitude of the transmission signal power and the distance between the transmission antennas may be considered to satisfy the SAR regulations.

Figure 4:
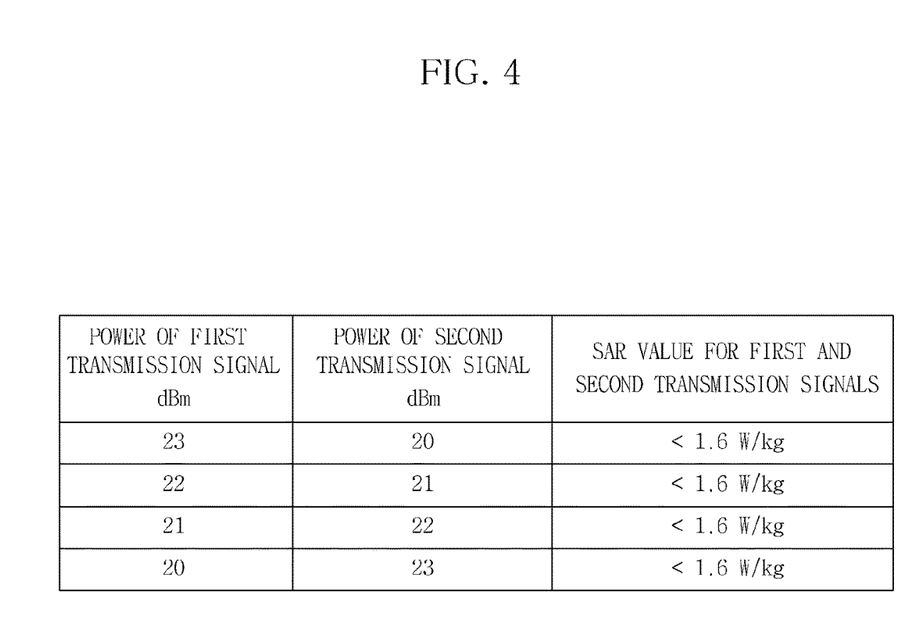
FIG. 4 is an example of an SAR table stored in a storage unit of the portable device according to an exemplary embodiment of the present invention.

The SAR table will be described in detail with reference to FIG. 4. The SAR table stores a list of pairs of the power levels of the first and the second transmission signals. The pair of the power levels of the first and the second transmission signals is a pair for achieving the maximum data transmission rate within a range that causes the transmission power level of the portable device 100 to exceed a preset value. For example, in a case where the first transmission signal has a power of 23 dBm in the B3 frequency band of the LTE network, the second transmission signal may have at maximum a power of 20 dBm in the B5 frequency band of the LTE network for the SAR value due to the generation of the first and the second transmission signals to not exceed the SAR upper limit of 1.6 W/kg. In addition, in a case where the first transmission signal has a power of 22 dBm, the second transmission signal may have a power of 21 dBm at maximum. Since an object of an embodiment of the present disclosure is to achieve the maximum data transmission rate, the power level of the second transmission signal may be set to increase as the power level of the first transmission signal decreases. Content of the SAR table disclosed in FIG. 4 is only an example, and various values may be stored in the SAR table.

The data transmission rate measuring unit 150 measures data transmission rates of the first and the second transmission signals, respectively. The data transmission rate measuring unit 150 transmits the transmission signal to the base station, receives the reception signal, and measures the data reception rate for each of the first and the second transmission signals. The data transmission rate measuring unit 150 transmits information regarding the data transmission rate to the control unit 160 during transmission and reception of the signals in order to achieve communication at the maximum data transmission rate according to the SAR regulations. The data transmission rate measuring unit 150 may be configured to be included in the control unit 160 as described below.

The control unit 160 determines the minimum transmission power level from the SNR between the base station and the portable device 100. For example, the minimum transmission power level for each of the first and second transmission channels at which the first and the second transmission signals may be transmitted is determined. In addition, the control unit 160 may control the power levels of the first and the second transmission signals by referring to the SAR table so that the portable device 100 may transmit signals at the maximum data transmission rates. The control unit 160 is configured to control communications to be performed according to the power levels of the first and the second transmission signals stored in the SAR table, and select a communication type having the maximum data transmission rate among the performed communications. For example, the control unit 160 may transmit the first and the second transmission signals at the power levels listed in the first and second rows of the SAR table illustrated in FIG. 4, and select the pair of power level having a faster data transmission rate by comparing the data transmission rates at different power levels. While the control unit 160 searches for a pair of power level of the first and second transmission signals having the maximum data transmission rate by implementing and comparing various pairs of transmission power levels, the control unit 160 may be configured not to implement a transmission power level below the minimum transmission power level to ensure that the communication is not interrupted.

Figure 5:
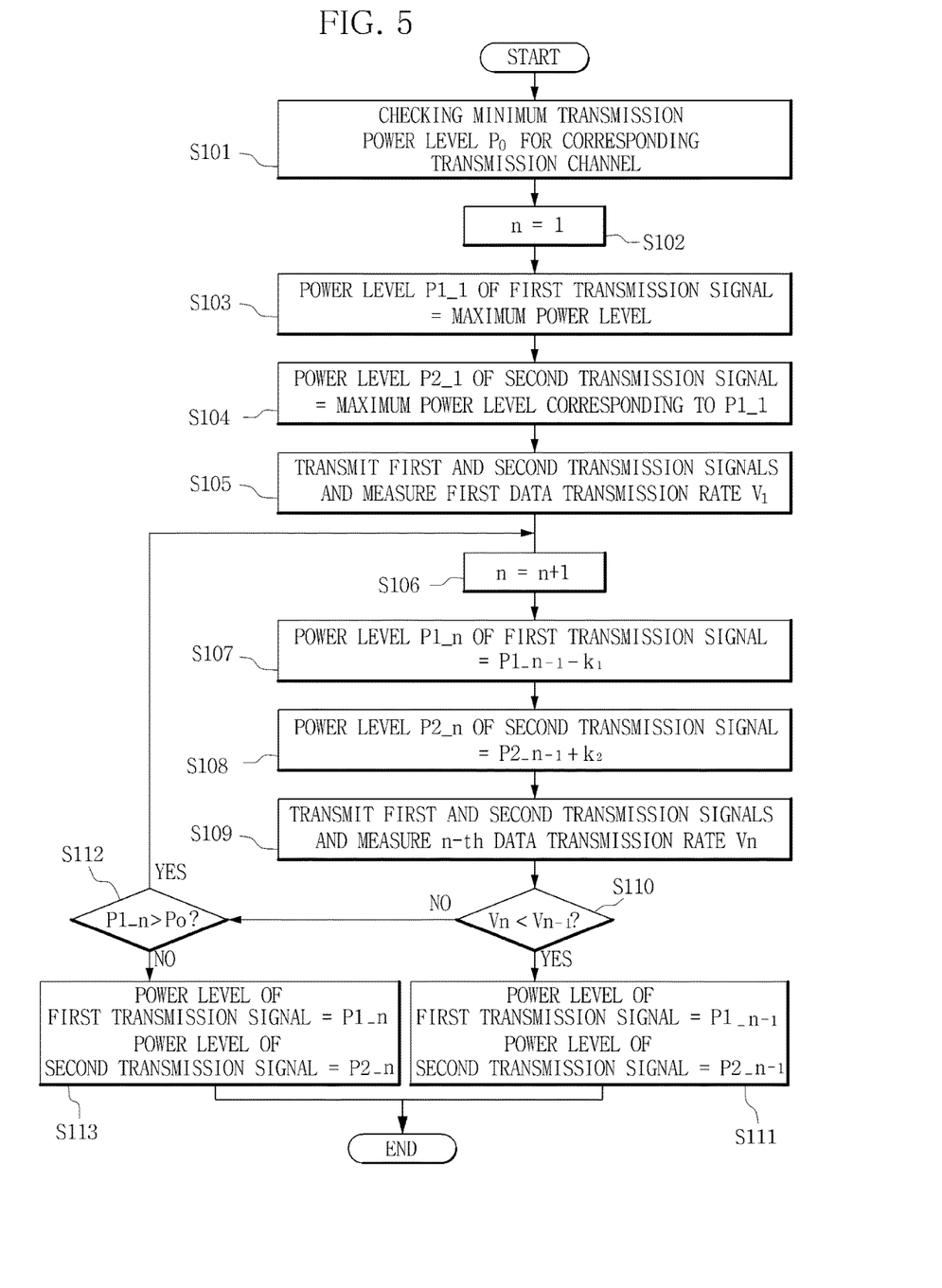
FIG. 5 is a flowchart of a transmission method of a transmission signal by the portable device according to an exemplary embodiment of the present invention.

FIG. 5 is a diagram illustrating the transmission method of the portable device 100 according to an exemplary embodiment of the present invention.

First, in S101, the portable device 100 (see FIG. 3) checks the minimum transmission power level $P_0$ for the corresponding transmission channel in which the transmission signal is transmitted. Specifically, the control unit 160 (see FIG. 3) may determine the minimum transmission power level for the corresponding transmission channel from the information regarding the SNR between the base station and the portable device 100. For example, if the channels for the first and the second transmission signals are the B3 and B5 bands of the LTE communication network, respectively, the control unit 160 may determine the minimum transmission power level for the B3 and the B5 bands.

In S102, an n value indicating the number of times the first transmission signal and the second transmission signal are transmitted is designated as one (1) indicating that the control unit 160 is commanding the first transmission.

In S103, during the first signal transmission, the control unit 160 sets the power level P1_1 of the first transmission signal at the maximum power level $Pm_1$. The maximum power level indicates that the maximum power level that the first transmission signal may have in a case where only the first transmission signal is transmitted in a single channel through the main antenna 130 as shown in FIG. 3.

In S104, the control unit 160 sets the power level P2_1 of the second transmission signal at the maximum power level $Pm_2$ that complies with the SAR regulations, based on the corresponding power level P1_1 of the first transmission signal. Here, the control unit 160 may set the power level P2_1 of the second transmission signal with reference to the SAR table. For example, P2_1 may be set at 20 dBm, if P1_1 is set at 23 dBm according to the SAR table in FIG. 4.

In S105, the main antenna 130 transmits the first and the second transmission signals at the set power levels P1_1 and P2_1, and the data transmission rate measuring unit 150 (see FIG. 3) measures a first data transmission rate V1.

In S106, the n value is set to equal (n+1) indicating the (n+1) time transmission of the first signal and the second signal. The control unit 160 commands the (n+1)-th signal transmission.

In S107, at the time of the second signal transmission of the first transmission and the second transmission signals, the control unit 160 sets the power level P1_2 of the first transmission signal to a value lower than the power level P1_1 of the first transmission signal during the first signal transmission by a preset value k1, i.e., P1_2=P1_1−k1. For example, the power level of the first transmission signal may be set at 22 dBm during the second signal transmission where k1 is 1 dBm.

In S108, the control unit 160 sets the power level P2_2 of the second transmission signal to a value higher than the power level P2_1 of the second transmission signal during the first signal transmission by a preset value k2. Here, k1 and k2 may have the same value or different values. The power levels P1_2 and P2_2 of the first and the second transmission signals during the second signal transmission are both set based on the SAR table. For example, P2_2 may be set at 21 dBm where k2 equals 1 dBm, when P1_1 is set at 22 dBm, based on the SAR table in FIG. 4.

Subsequently in S109, the main antenna 130 transmits the first and the second transmission signals at the set power levels P1_2 and P2_2, and the data transmission rate measuring unit 150 measures the second data transmission rate V2.

In S110, the control unit 160 compares the magnitudes of the first data transmission rate V1 and the second data transmission rate V2, and if the first data transmission rate V1 is greater than the second data transmission rate V2, the power levels of the first and the second transmission signals are respectively set to the power levels P1_1 and P2_1 of the first transmission as shown in S111, i.e., the power levels of the first and second transmission signals are respectively set to P1_n−1 and P2_n−1, which, in this example, are P1_1 and P2_1.

On the other hand, if the first data transmission rate V1 is not greater than the second data transmission rate V2, in order to find a pair of power levels that has a higher data transmission rate, the control unit 160 proceeds to a third signal transmission of the first and the second transmission signals.

In S112, before the third signal transmission is performed, the control unit 160 determines whether the power level P1_2 of the first transmission signal is greater than the minimum transmission power level $P_0$ in S101. This is because, while the power levels P1_1 to P1_n of the first transmission signal from the first signal transmission to the n-th signal transmission are lowered each time by the preset value k1 to be tested, smooth data transmission and reception are ensured when the power level of the first transmission signal is higher than the minimum transmission power level $P_0$.

As shown in S112, if the power level P1_2 of the first transmission signal is higher than the minimum transmission power level $P_0$, the control unit 160 proceeds to the third signal transmission of the first and the second transmission signals. However, in S112, if the power level P1_2 of the first transmission signal is not higher than the minimum transmission power level $P_0$, the control unit 160 respectively sets the power levels of the first and the second transmission signals to the power levels P1_2 and P2_2 of the second signal transmission as illustrated in S113, i.e., the power levels of the first and second transmission signals are respectively set to P1_n and P2_n, which, in this example, are P1_2 and P2_2.

As illustrated in FIG. 5 and described above, the portable device 100 according to an exemplary embodiment of the present invention repeats the operations S106 to S113 in order to search for the maximum data transmission rate, compares transmission at the (n−1)-th stage and transmission at the n-th stage with each other, and performs communication at the transmission operation having a higher transmission rate. In FIG. 5, for generalization of the first to n-th signal transmission, the power levels of the first transmission signals are denoted as P1_1, P1_2, ... P1_n, the power levels of the second transmission signals are denoted as P2_1, P2_2, ... P2_n, and the data transmission rates are denoted as V1, V2, ... $V_n$.

Searching for transmission of a transmission signal at the maximum data transmission rate in the range in which the SAR regulations are satisfied by comparing the transmission of the (n−1)-th stage and the transmission of the n-th stage are described above. However, it would be apparent to those skilled in the art that various modifications and variations in relation to the SAR table can be made without departing form the spirit or scope of an exemplary embodiment of the present invention.

In the case of the related art, when signals in two bands having different frequencies are transmitted, the power level of one of the transmission signals is lowered in order to satisfy the SAR regulations. This creates problems such as the data transmission rate significantly decreasing, unstable communication quality, and interruption of communication. However, according to an exemplary embodiment of the present invention as described above, even in a case where signals in two different frequency bands are simultaneously transmitted, communication with stable communication quality may be provided while satisfying the SAR regulations. Furthermore, the data communication rate may be improved by optimizing the data transmission rate.

Figure 6:
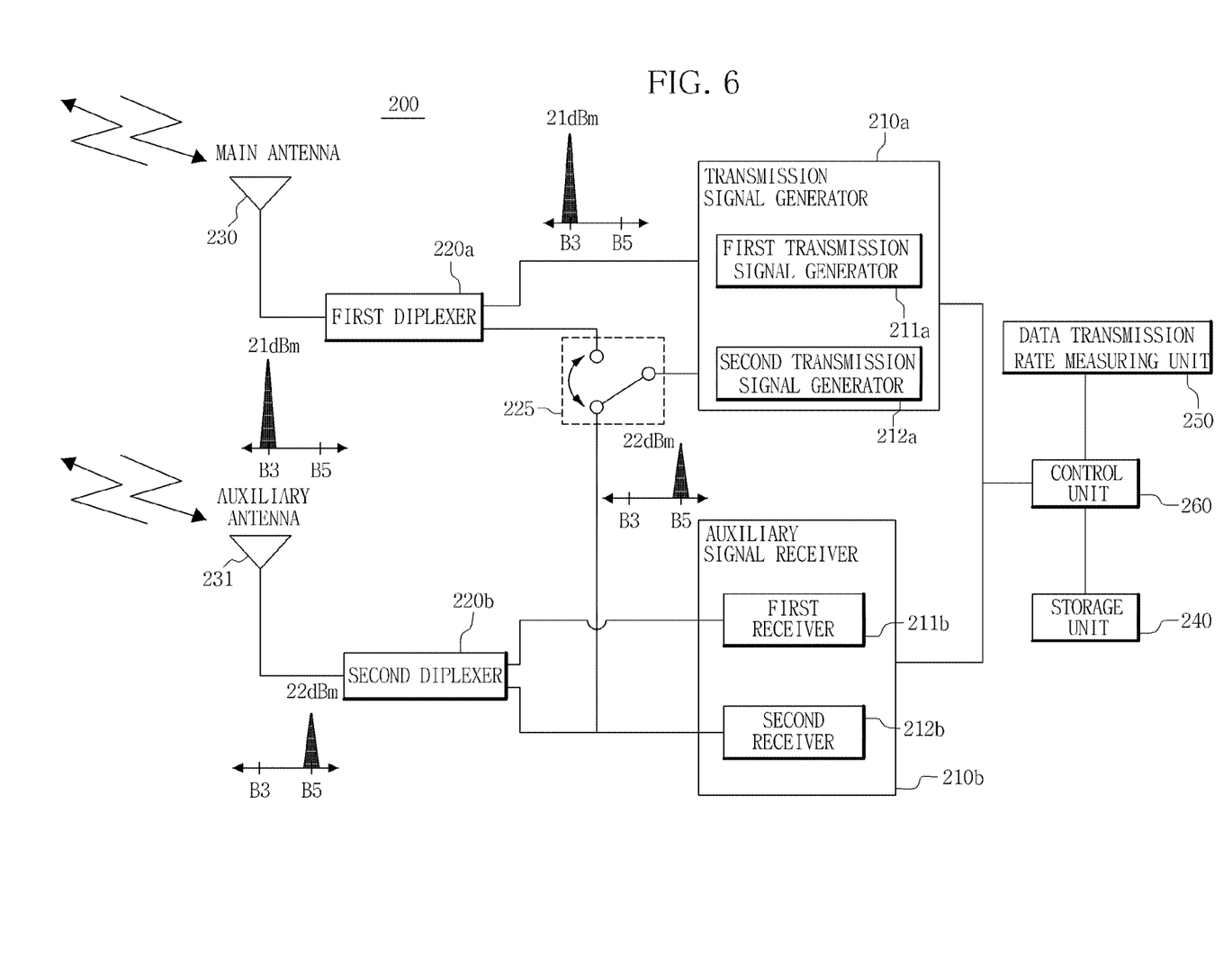
FIG. 6 is a structural diagram of a portable device according to an exemplary embodiment of the present invention.

FIG. 6 illustrates a portable device according to an exemplary embodiment of the present invention which will be described in detail below.

Referring to FIG. 6, the portable device 200 according to an exemplary embodiment of the present disclosure includes a transmission signal generator 210a (including the first transmission signal generator 211a and the second transmission signal generator 212a), an auxiliary signal receiver 210b, first and second diplexers 220a, 220b, a main antenna 230, an auxiliary antenna 231, a storage unit 240, a data transmission rate measuring unit 250, and a control unit 260.

The portable device 200 according to an exemplary embodiment includes the auxiliary antenna 231. Generally, the auxiliary antenna 231 is embodied for a multiple input multiple output (MIMO) system or for the purpose of diversity. The auxiliary antenna 231 according to an exemplary embodiment of the present disclosure is provided for the MIMO system, and is disposed apart from the main antenna 230 in the portable device 200. The MIMO system transmits data in various paths through a plurality of antennas, and detects signals received from each of the paths, thereby reducing interference and improving data transmission rate. In addition, since the SAR value is inversely proportional to the distance between the transmission antennas, in a case where the MIMO system is used, the SAR value is decreased compared to a case where only a single antenna is used, and thus transmission may be performed at a higher power level in each of the antennas which may increase the data transmission rate.

Therefore, the auxiliary antenna 231 according to an exemplary embodiment of the present disclosure is configured to be additionally included for the purpose of increasing data transmission rate. In addition to the auxiliary antenna 231, the second diplexer 220b, the auxiliary signal receiver 210b, and a switch 225 may be included. The main antenna 230, and the first diplexer 220a, the transmission signal generator 210a, the data transmission rate measuring unit 250, and the storage unit 240 are the same as that of an exemplary embodiment illustrated in FIG. 1 and discussed above, and thus the description according to another embodiment will be omitted.

The auxiliary signal receiver 210b may receive signals received through the auxiliary antenna 231. The auxiliary signal receiver 210b includes a first receiver 211b and a second receiver 212b.

As described in reference to the diplexer 20 in FIG. 2 above, the first diplexer 220a and the second diplexer 220b may independently transmit two transmission signals in different frequency bands to the antenna without interfering with each other.

The switch 225, located at an intermediate position between the second transmission signal generator 212a and the first diplexer 220a, connects the two and selectively transmits the second transmission signal to the main antenna 230 or the auxiliary antenna 231. The switch 225 is controlled by the control unit 260. As illustrated in FIG. 6, if the switch 225 is connected to the second diplexer 220b, the first transmission signal is transmitted through the main antenna 230. If the switch 225 is connected to the first diplexer 220a, the first transmission signal and the second transmission signal are transmitted through the main antenna 230. For example, the first transmission signal in the LTE B3 frequency band is always transmitted through the main antenna 230. However, the second transmission signal in the LTE B5 frequency band is transmitted through the main the antenna 230 or the auxiliary antenna 231 according to the position of the switch 225.

As described above, the auxiliary antenna 231 is included in the MIMO system along with the main antenna 230, and transmits the second transmission signal according to the state of the switch 225.

The control unit 260 performs both the data transmission using the main antenna 230 and the data transmission using the auxiliary antenna 231, compares the data transmission rates between the two data transmissions, and controls the device to perform data transmission at a higher transmission rate. For example, once communication through the main antenna 230 and the auxiliary antenna 231 by the switch 225 are performed, if the control unit 260 determines that the data communication through the auxiliary antenna 231 is faster, the control unit 260 may control the switch 225 to transmit the second transmission signal only through the auxiliary antenna 231. Meanwhile, the control unit 260 frequently checks the data transmission rate, and may change the state of the switch 225 to perform transmissions at the optimum data transmission rate as the communication environment is changed.

Figure 7:
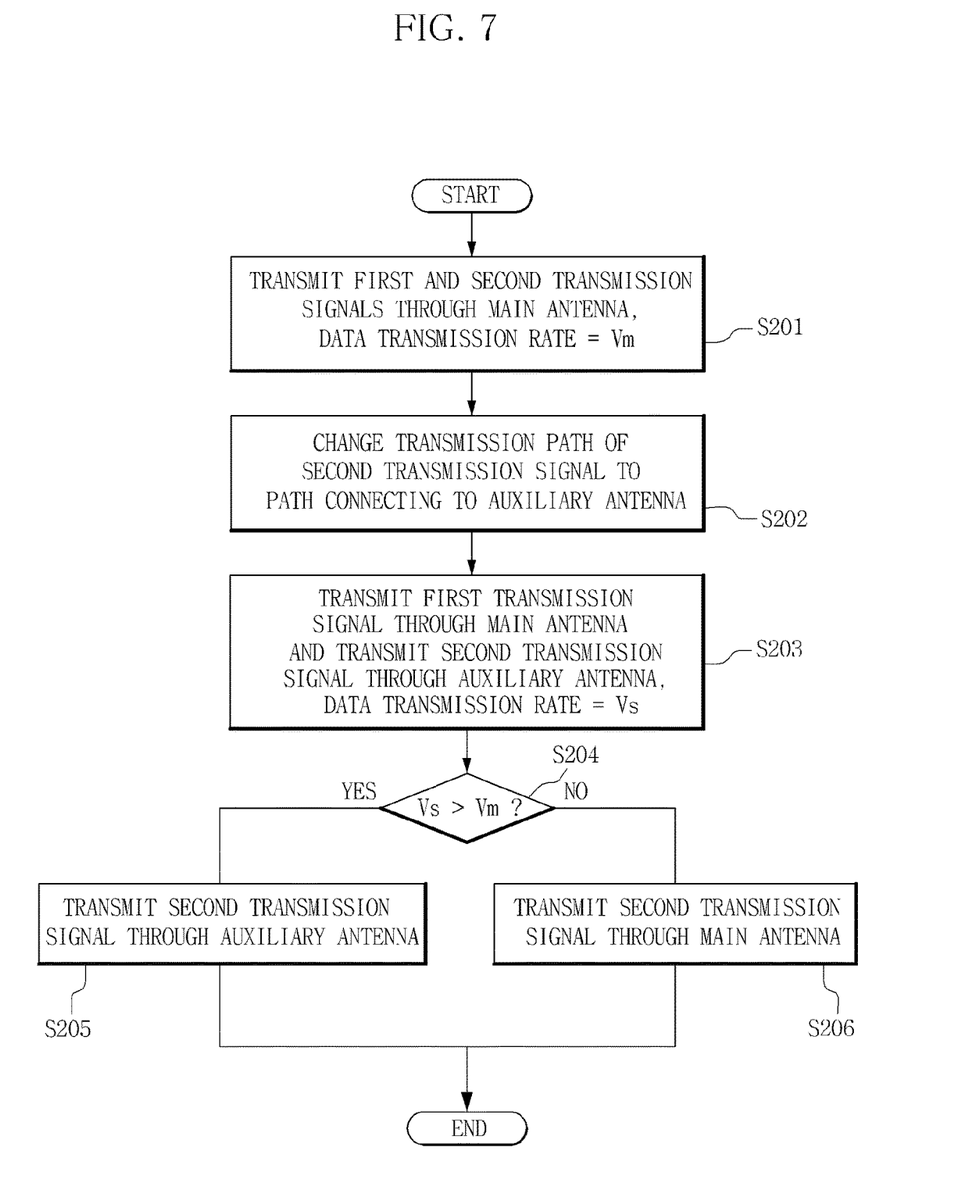
FIG. 7 is a flowchart of a transmission method of a transmission signal by the portable device according to an exemplary embodiment of the present invention.

FIG. 7 illustrates a transmission method of the portable device 200 according to an exemplary embodiment of the present invention which will be described in detail below.

Referring to FIG. 7, in S201, the first transmission signal and the second transmission signal are transmitted through the main antenna 230 in FIG. 6, at the maximum data transmission rate Vm. In S201, all the operations described with reference to FIG. 5 are performed. That is, in S201, the portable device 200 in FIG. 6 checks the minimum transmission power level, and performs data communication at the maximum data transmission rate Vm determined by going through operations S101 through S113. Initially, the switch 225 (see FIG. 6) sets the transmission path of the second transmission signal to be directed to the first diplexer 220*a* (see FIG. 6).

After S201, in S202 the control unit 260 (see FIG. 6) changes the state of the switch 225, and sets the transmission path of the second transmission signal to be directed to the second diplexer 220*b*.

Subsequently in S203, the control unit 260 transmits the first transmission signal through the main antenna 230, transmits the second transmission signal through the auxiliary antenna 231 (see FIG. 6), and measures the data transmission rate Vs. Here, the control unit 260 may transmit the second transmission signal by increasing the power level thereof. For example, when the second transmission signal is transmitted through the main antenna 230 at a power of 21 dBm, the power of the second transmission signal transmitted through the auxiliary antenna 231 may be increased to 22 dBm. In a MIMO system, as described above, since the SAR value is decreased compared to a system using a single antenna, the transmission power may be increased in relation to the decrease in the SAR value.

In S204, the control unit 260 compares the data transmission rate Vm through the main antenna 230 and the data transmission rate Vs through the auxiliary antenna 231.

If the data transmission rate Vs through the auxiliary antenna 231 is greater, the control unit 260 maintains the state of the switch 225 as it is, and controls the second transmission signal to be continuously transmitted through the auxiliary antenna 231 as shown in S205.

In contrast, if the data transmission rate Vm through the main antenna 230 is greater than the data transmission rate Vs through the auxiliary antenna 231, the control unit 260 changes the state of the switch 225, and controls the second transmission signal to be transmitted through the main antenna 230 as shown in S206.

As described above, if the MIMO system is applied to an exemplary embodiment of the present invention, further optimization of the data transmission rate may be provided in a transmission power rage satisfying the SAR regulations. As the seriousness of the harmfulness of electromagnetic waves has been recognized, recently, the SAR regulations have become strict, and a degree of electromagnetic wave exposure to the human body is a factor considered when purchasing a portable device 200. Accordingly, in the near future, it is expected that the importance of data transmission at the maximum data transmission rate in a limited transmission power range will be emphasized, and in this aspect, an exemplary embodiment of the present invention including a MIMO system will have great significance as an invention suggesting a solution.

In addition, the present disclosure may be embodied as computer-readable codes on a computer-readable storage medium. The computer-readable storage medium may be any storage device that may store data which may be thereafter read by a computer system. Examples of the computer-readable storage medium include ROM, RAM, CD-ROM, magnetic tapes, floppy disks, and optical data storage devices. In addition, the computer-readable storage medium may be distributed over network coupled computer systems so that the computer readable code is stored and executed in a distributed fashion.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A portable device to transmit signals, the portable device comprising:
    a transmission signal generator to generate a first transmission signal and a second transmission signal;
    a first diplexer to transmit the first transmission signal and the second transmission signal;
    a main antenna to receive the first transmission signal and the second transmission signal from the first diplexer and to transmit the first transmission signal and the second transmission signal to a base station;
    a storage unit to store a table of pairs of power levels of the first transmission signal and the corresponding second transmission signal;
    a measuring unit to measure a data transmission rate at the main antenna of the first transmission signal and the second transmission signal; and
    a control unit to set the power levels of the first transmission signal and the second transmission signal based on the stored pairs of power levels,
    wherein the power level of the second transmission signal in a second transmission increases by a predetermined value from a first transmission as the power level of the first transmission signal decreases by a predetermined value from the first transmission to the second transmission.

2. The apparatus of claim 1, wherein the main antenna transmits the first transmission signal and the second transmission signal to a base station through a first transmission channel and a second transmission channel.

3. The apparatus of claim 2, wherein the storage unit stores the table of pairs of power levels of the first and second transmission signals in a specific absorption rate (SAR) table, a signal to noise ratio (SNR) between the portable device and the base station and a minimum transmission power level corresponding to the SNR,
    wherein the minimum transmission power level is a power level that does not interrupt communication in the corresponding transmission channel.

4. The apparatus of claim 3, wherein the control unit controls the power levels of the first transmission signal and the second transmission signal to be equal to or higher than the minimum transmission power level.

5. The apparatus of claim 1, wherein the measuring unit measures the data transmission rate of the first transmission and the second transmission, and the control unit sets the power levels of the first transmission signal and the second transmission signal as the power levels of a transmission with a higher data transmission rate.

6. The apparatus of claim 1, wherein the portable device further comprises:

a second diplexer to transmit the second transmission signal;

an auxiliary antenna to receive the second transmission signal; and a switch to connect the transmission signal generator to the first diplexer or the second diplexer.

7. The apparatus of claim 6, wherein, when a data transmission rate of a transmission by the auxiliary antenna is higher than a data transmission rate of a transmission by the main antenna, the control unit controls the switch to connect to the second diplexer to transmit the second transmission signal to the auxiliary antenna while transmitting the first transmission signal to the main antenna.

8. The apparatus of claim 6, wherein, when a data transmission rate of a transmission by the auxiliary antenna is higher than the data transmission rate of the transmission by the main antenna, the control unit controls the switch to connect to the first diplexer to transmit the first transmission signal and the second transmission signal to the main antenna.

9. The apparatus of claim 6, wherein the auxiliary antenna is included in a multiple input multiple output (MIMO) system.

10. A method to transmit signals from a portable device, the method comprising:

generating a first transmission signal and a second transmission signal from a transmission generator;

transmitting the first transmission signal and the second transmission signal from a diplexer to a main antenna;

transmitting the first transmission signal and the second transmission signal by the main antenna to the base station;

measuring a data transmission rate of the transmission by the main antenna of the pairs of first transmission signal and the second transmission signal; and controlling the power levels of a first transmission rate of the first transmission signal and a second transmission rate of the second transmission signal based on a stored table of pairs of power levels of the first transmission signal and the corresponding second transmission signals, wherein in a first transmission, the power level of the first transmission signal is set at a predetermined maximum power level and the power level of the second transmission signal is set at a corresponding power level based on the stored table, wherein in a second transmission, the power level of the first transmission signal is lowered by a predetermined value from the power level of the first transmission signal in the first transmission and the power level of the second transmission signal is set at a corresponding power level based on the stored table.

11. The method of claim 10, wherein the pairs of power levels are stored in a specific absorption rate (SAR) table.

12. The method of claim 10, wherein, when a data transmission rate of the first transmission is higher than a data transmission rate of the second transmission, the power levels of the first transmission signal and the second transmission signal are set as the power levels in the first transmission.

13. The method of claim 10, wherein, when a data transmission rate for the second transmission is higher than a data transmission rate of the first transmission and the power level of the first transmission signal in the second transmission is lower than a minimum power level, the power level of the first transmission signal is set as the power level of the first transmission signal in the second transmission.

14. The method of claim 13, wherein, when the power level of the first transmission signal in the second transmission is higher than the minimum power level, a third transmission is transmitted.

15. The method of claim 14, wherein, in the third transmission, the power level of the first transmission signal is lowered by the predetermined value and the power level of the second transmission signal is set at a corresponding power level based on the SAR table.

16. The method of claim 10, the method further comprising:

connecting the transmission generator with a second diplexer;

transmitting the second transmission signal from the second diplexer to an auxiliary antenna; and measuring a data transmission rate of the second transmission signal transmitted by the auxiliary antenna.

17. The method of claim 16, wherein, when the data transmission rate of the transmission by the auxiliary antenna is higher than the data transmission rate of the transmission by the main antenna, the second transmission signal is transmitted by the auxiliary antenna while the first transmission signal is transmitted by the main antenna.

18. The method of claim 16, wherein, when the data transmission rate of the transmission by the auxiliary antenna is lower than the data transmission rate of the transmission by the main antenna, the first transmission signal and the second transmission signal are transmitted by the main antenna.

* * * * *